(12) United States Patent
Kommula et al.

(10) Patent No.: US 10,454,809 B2
(45) Date of Patent: Oct. 22, 2019

(54) AUTOMATIC NETWORK TOPOLOGY DETECTION FOR MERGING TWO ISOLATED NETWORKS

(71) Applicant: Nicira, Inc., Palo Alto, CA (US)

(72) Inventors: Raja Kommula, Cupertino, CA (US); Thayumanavan Sridhar, Sunnyvale, CA (US); Rajendra Yavatkar, Saratoga, CA (US)

(73) Assignee: VMware, Inc., Palo Alto, CA (US)

( * ) Notice: Subject to any disclaimer, the term of this patent is extended or adjusted under 35 U.S.C. 154(b) by 173 days.

(21) Appl. No.: 15/617,521

(22) Filed: Jun. 8, 2017

(65) Prior Publication Data

US 2018/0359171 A1 Dec. 13, 2018

(51) Int. Cl.
*G06F 15/177* (2006.01)
*H04L 12/751* (2013.01)
*H04L 29/12* (2006.01)
*H04L 12/753* (2013.01)
*H04L 12/707* (2013.01)
*H04L 12/24* (2006.01)
*H04L 29/06* (2006.01)
*H04L 12/26* (2006.01)

(52) U.S. Cl.
CPC .......... *H04L 45/02* (2013.01); *H04L 41/0853* (2013.01); *H04L 41/12* (2013.01); *H04L 43/10* (2013.01); *H04L 45/24* (2013.01); *H04L 45/48* (2013.01); *H04L 61/103* (2013.01); *H04L 69/18* (2013.01); *H04L 61/6022* (2013.01)

(58) Field of Classification Search
CPC ..... H04L 41/0816; H04L 41/12; H04L 43/18; H04L 45/02; H04L 45/24; H04L 45/48; H04L 61/103; H04L 69/18
USPC ........................................................ 709/228
See application file for complete search history.

(56) References Cited

U.S. PATENT DOCUMENTS

| | | | | |
|---|---|---|---|---|
| 5,886,643 | A * | 3/1999 | Diebboll | H04L 41/12 370/245 |
| 8,156,213 | B1 * | 4/2012 | Deng | H04L 41/084 709/223 |
| 9,020,474 | B2 * | 4/2015 | Guo | H04W 24/00 455/414.1 |
| 2004/0064591 | A1 * | 4/2004 | Noble | H04L 41/0806 709/250 |
| 2008/0016224 | A1 * | 1/2008 | Wan | H04L 45/02 709/227 |

(Continued)

*Primary Examiner* — Phuoc H Nguyen (57) ABSTRACT

The technology disclosed herein automatically detects network topology for merging two isolated networks. In a particular embodiment, a method is performed in a first network of the two isolated networks and provides sending probe messages to a second network of the two isolated networks. The probe messages formatted for one or more passive protocols in the second network. The method further provides receiving replies to at least a portion of the probe messages from the second network indicating configuration parameters of the passive protocols and receiving neighbor messages from the second network indicating configuration parameters of active protocols in the second network. Additionally, the method provides determining a network topology of the second network using the configuration parameters of the passive protocols and the configuration parameters of the active protocols.

18 Claims, 10 Drawing Sheets

(56) References Cited

U.S. PATENT DOCUMENTS

| | | | |
|---|---|---|---|
| 2008/0056164 A1* | 3/2008 | Stratton | H04L 12/185 370/260 |
| 2009/0043910 A1* | 2/2009 | Barsness | G06F 16/24532 709/237 |
| 2009/0116404 A1* | 5/2009 | Mahop | H04L 41/0213 370/254 |
| 2012/0131153 A1* | 5/2012 | Schmidt | H04L 61/103 709/220 |
| 2014/0181292 A1* | 6/2014 | Venkataswami | H04L 45/02 709/224 |
| 2014/0258358 A1* | 9/2014 | Lin | H04L 67/104 709/201 |
| 2014/0297846 A1* | 10/2014 | Hoja | H04L 43/10 709/224 |
| 2015/0195105 A1* | 7/2015 | Zhuang | H04L 12/4641 370/254 |

\* cited by examiner

AUTOMATIC NETWORK TOPOLOGY DETECTION FOR MERGING TWO ISOLATED NETWORKS

TECHNICAL BACKGROUND

When two isolated networks are merged together communications between those two previously isolated networks may depend on the topologies of each respective network. Typically, network administrators must go through the difficult task of understanding topology of both networks, and creating the necessary configuration on the merge point to translate packets from network into the other. Given the human element, that process can be time consuming and error prone.

An example of the above environment is VMware Cloud Foundation™ (VCF) or similar hyper converged infrastructure. Customers can purchase one or more VCF based server racks, which are connected using a leaf-spine network topology, and integrate the VCF network system into the customer's existing network having its own network topology. VCF software has knowledge of its own network topology but is unaware of the network topology of the customer's network, as the customer network could have an entirely different network topology. Integrating these two isolated networks requires a lot of planning and manual configuration on the transit switch(es) therein.

SUMMARY

The technology disclosed herein automatically detects network topology for merging two isolated networks. In a particular embodiment, a method is performed in a first network of the two isolated networks and provides sending probe messages to a second network of the two isolated networks. The probe messages formatted for one or more passive protocols in the second network. The method further provides receiving replies to at least a portion of the probe messages from the second network indicating configuration parameters of the passive protocols and receiving neighbor messages from the second network indicating configuration parameters of active protocols in the second network. Additionally, the method provides determining a network topology of the second network using the configuration parameters of the passive protocols and the configuration parameters of the active protocols.

In some embodiments, determining the network topology comprises determining whether a number of uplinks to the second network are enabled on one or more gateways between the first network and the second network. The number of uplinks indicates a number of switches in the second network with uplinks to the gateways.

In the above embodiments, upon determining that the number of switches is one switch, the method provides determining whether Bridge Protocol Data Units (BPDUs) and/or Virtual Port-Channel (VPC) control packets are detected on an uplink from the one switch. Upon determining that BPDUs and/or VPC control packets are detected, the method provides determining that the network topology comprises a single upstream Level 2 (L2) switch. Upon determining that neither BPDUs nor VPC control packets are detected, the method provides using an Address Resolution Protocol (ARP) request to determine that the network topology comprises a single upstream Level 3 (L3) switch.

Continuing the above embodiments, upon determining that the number of switches is two switches, receiving a response to an Address Resolution Protocol (ARP) request directed to one of the two switches through the other of the two switches. Receiving the response indicates that Level 2 (L2) uplinks exist from both of the two switches. If the L2 uplinks are connected to the same switch, the method provides determining that the network topology comprises a single L2 upstream switch when the L2 uplinks are connected to the same switch. If the L2 uplinks are not connected to the same switch and Virtual Port-Channel (VPC) control packets are detected on the L2 uplinks, determining that the network topology comprises multiple upstream L2 switches with VPC enabled.

In another continuation of the above embodiments, if the L2 uplinks are not connected to the same switch and no VPC control packets are detected, the method provides transferring a second ARP request directed to the one of the two switches through the other of the two switches. If no response to the second ARP request is received, the method provides determining that the network topology comprises two upstream L2 switches operating with Spanning Tree Protocol (STP). If a response to the second ARP request is received, the method provides determining that the network topology comprises multiple disjoined L2 switches with cross links when the L2 uplinks are connected to multiple switches and determining that the network topology comprises multiple disjoined L2 switches without cross links when the L2 uplinks are not connected to multiple switches.

In some embodiments, upon determining that the number of switches is two switches, the method provides receiving no response to an Address Resolution Protocol (ARP) request directed to one of the two switches through the other of the two switches. Receiving no response indicates that Level 3 (L3) uplinks exist from both of the two switches. The method further provides using Link Layer Discovery Protocol (LLDP) input to determine whether the L3 uplinks are each connected to multiple switches. If the L3 uplinks are each connected to multiple switches, the method provides determining that the network topology comprises two L3 switches with Equal Cost Multipath Routing (ECMP) enabled. If the L3 uplinks are not each connected to multiple switches, the method provides determining that the network topology comprises a single L3 switch when the L3 uplinks are connected to the same switch and determining that the network topology comprises two L3 switches without ECMP enabled when the L3 uplinks are not connected to the same switch.

In some embodiments, the method provides configuring the first network for communications with the second network based on the network topology.

In some embodiments, the probe messages comprise connection requests to one or more peer nodes in the second network.

The active protocols of the above embodiments may include one or more protocols of a protocol set comprising Virtual Router Redundancy Protocol (VRRP), Link Aggregation Control Protocol (LACP), Open Shortest Path First (OSPF), Virtual Port-Channel (VPC), Protocol Independent Multicast (PIM), Link Layer Discovery Protocol (LLDP), Cisco Discovery Protocol (CDP), and Spanning Tree Protocol (STP). The passive protocols may include one or more protocols of a protocol set comprising Border Gateway Protocol (BGP) and Internet Control Message Protocol (ICMP).

In another embodiment, a system, in a first network of two isolated networks, is provided having one or more computer readable storage media and a processing system operatively coupled with the one or more computer readable storage media. Program instructions stored on the one or more computer readable storage media, when read and executed by the processing system, direct the processing system to send probe messages to a second network of the two isolated networks. The probe messages formatted for one or more passive protocols in the second network. The program instructions further direct the processing system to receive replies to at least a portion of the probe messages from the second network indicating configuration parameters of the passive protocols and receive neighbor messages from the second network indicating configuration parameters of active protocols in the second network. The program instructions also direct the processing system to determine a network topology of the second network using the configuration parameters of the passive protocols and the configuration parameters of the active protocols.

DETAILED DESCRIPTION

The implementations provided herein allow for a first network to automatically determine a network topology of a second network so that the two isolated networks can be merged. In particular, knowledge of the second network's topology may be necessary for network traffic to pass between the two networks. That is, the second network's topology may affect how network traffic is formatted and the protocols used to properly transfer the network traffic to its intended destination. While it is possible for an administrator to provide protocol configuration to the first network based on the second network's topology, that process may be prone to errors and may be very time consuming to the network administrator. Thus, providing the first network with the ability to automatically determine the second network's topology will allow the first network to then automatically configure itself to exchange network traffic with that second network.

Figure 1:
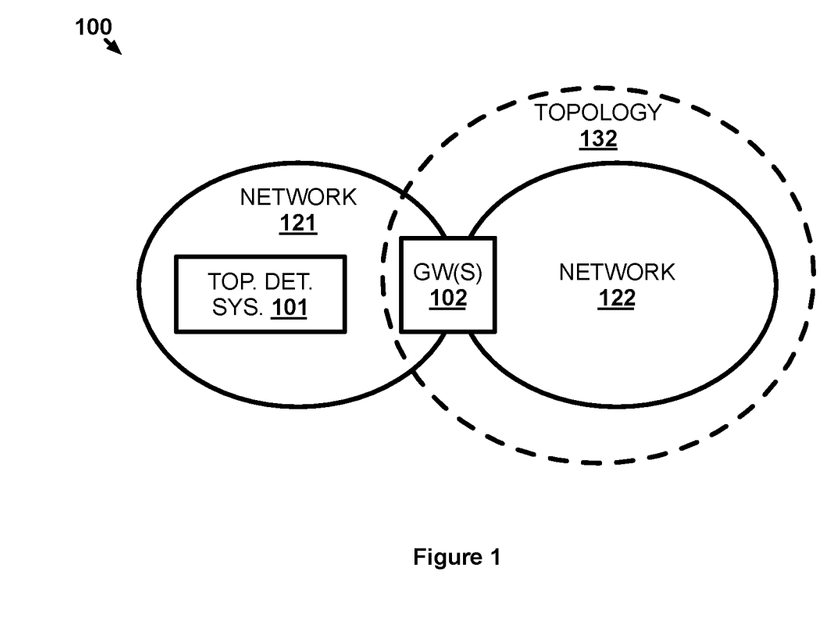
FIG. 1 illustrates a network environment for automatically determining network topology.

FIG. 1 illustrates network environment 100 for automatically determining network topology. Network environment 100 includes topology determination system 101, gateway(s) 102, communication network 121, and communication network 122. Communication network 121 and communication network 122 communicate over communication link(s) 111 via gateway(s) 102. Gateway(s) 102 connect communication network 121 to communication network 122 and may be considered part of one or both of networks 121 and 122. Communication network 122 has network topology 132, which in this example is shown to include gateway(s) 102. In other examples, network topology 132 may not include gateway(s) 102. Though not shown, it should be understood that gateway(s) 102 connects to communication network 121 and communication network 122 via physical communication links.

In operation, topology determination system 101 may be a dedicated physical computing system to detect network topology 132. Such a physical computing system may include processing circuitry (e.g., one or more Central Processing Units (CPUs), bus controllers, etc.), storage media (e.g., Random Access Memory (RAM), flash memory, hard disk drives, etc.), program instructions stored on the storage media for execution by the processing circuitry, network interface circuitry, or some other type of physical computing resource. Alternatively, topology determination system 101 may be implemented as a virtual computing element (e.g., virtual machine, container, etc.) executing in a host environment provided by a host computing system having similar physical computing resources to those described above.

Topology determination system 101 may be part of a Software Defined Data Center (SDDC) implemented as a hyper converged infrastructure. In such examples, communication network 121 may connect server racks having servers therein that host virtual elements to implement services of the SDDC. Each individual server of the SDDC may include SDDC manager software modules executing thereon for facilitating the various virtual elements of the SDDC and the communications there between. Topology determination system 101 may be implemented as a component of one of the SDDC managers. Thus, once topology determination system 101 determines network topology 132, topology determination system 101 may configure to the SDDC so that the virtual elements therein can exchange communications with communication network communication 122.

Figure 2:
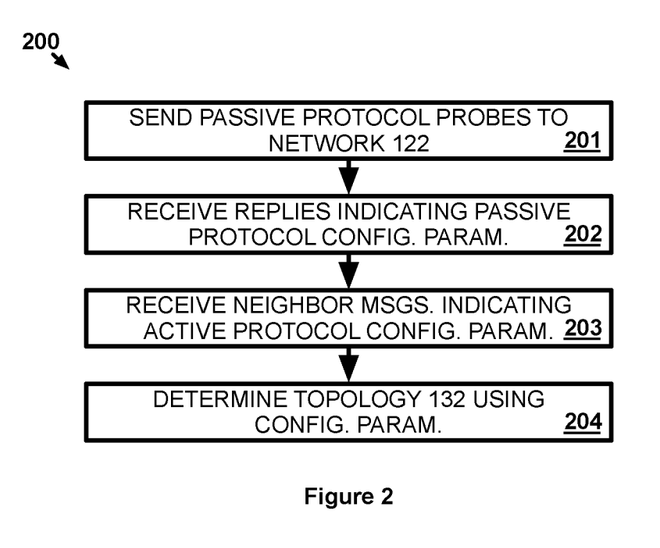
FIG. 2 illustrates a method of operating the network environment to automatically determining network topology.

FIG. 2 illustrates method 200 of operating network environment 100 to automatically determining network topology. Method 200 provides topology determination system 101 sending probe messages to communication network 122 (201). The probe messages enter communication network 122 via gateway(s) 102. Gateway(s) 102 may comprise one or more physical network switches that direct network communications between communication network 122 and communication network 121. The probe messages formatted for one or more passive protocols that may be used in communication network 122. Passive protocols, such as Border Gateway Protocol (BGP), Maximum Transmission Unit (MTU) detection, and Internet Control Message Protocol (ICMP), do not provide protocol information without the information being requested. Respective probe messages in this example are transferred in accordance with the corresponding protocol for which protocol information is being requested. For some passive protocols, the probe messages may comprise connection request messages in the protocols. In some examples, the probe messages may be generated using information gleaned from active protocol messages discussed below and vice versa. Also, topology determination system 101 may send the probe messages by instructing other network elements, better positioned within the network, to send the probe messages and report back regarding any responses.

Method 200 further provides receiving replies, from communication network 122, to at least a portion of the probe messages indicating configuration parameters of the passive protocols (202). If a reply is not received in a particular protocol, then topology determination system 101 may assume that the protocol is not in use by communication network 122. The configuration parameters indicated by the replies that are received may include MTU length, BGP routing information, or some other type of information that may either indicate network topology or may be used to identify network topology.

In addition to the steps above that determine the configuration parameters of the passive protocols, method 200 provides topology determination system 101 receiving neighbor messages from communication network 122 indicating configuration parameters of active protocols communication network 122 (203). Unlike passive protocols, network elements using active protocols send out periodic advertisements and control information to all neighbors. In this example, communication network 121 is a neighbor of communication network 122 through gateway(s) 102. Accordingly, in order for topology determination system 101 to identify active protocols in use by communication network 122, topology determination system 101 need only monitor active protocols for an amount of time long enough so as to capture at least one of the periodic messages transferred by each protocol. Examples of active protocols that may be used by communication network 122 include Virtual Router Redundancy Protocol (VRRP), Link Aggregation Control Protocol (LACP), Open Shortest Path First (OSPF), Virtual Port-Channel (VPC), Protocol Independent Multicast (PIM), Link Layer Discovery Protocol (LLDP), Cisco Discovery Protocol (CDP), and Spanning Tree Protocol (STP). Topology determination system 101 may be situated relative to gateway(s) 102 to receive the configuration information directly from network communication links or may use other elements, such as a network traffic sniffer, to capture and pass the configuration information to topology determination system 101.

Each of the above protocols transfers neighbor messages with different information. For example, a VRRP master node sends periodic hellos to all the peers. Active gateway network address(es) and subnet information can be obtained by topology determination system 101 by capturing and inspecting these packets. LACP sends hello packets every 1 second or 30 seconds. The information in the hello packets be used to identify which physical network interfaces are bonded together when determining network topology 132. OSPF hello packets are sent periodically to all the neighbors and may be used by topology determination system 101 to identify whether OSPF is enabled in communication network 122 and communication network 122's OSPF configuration. Network switches exchange periodic VPC control packets to remain in sync with each other. These control packets identify whether VPC is enabled in communication network 122 along with communication network 122's VPC configuration. PIM hello messages are usually sent every 30 secs and PIM packets identify whether multicast is enabled in communication network 122. Periodic protocols packets from LLDP and CDP may be used to identify neighbor MAC addresses, VLANs, switch-names, etc. Reception of STP Bridge Protocol Data Units (BPDUs) on an interface identify that the interface is a Level 2 (L2) interface.

Method 200 then provides topology determination system 101 determining network topology 132 using the configuration parameters of the passive protocols and the configuration parameters of the active protocols (204). In some examples, topology determination system 101 may gather all possible configuration information in the steps above before determining network topology 132. In other examples, the gathering of the configuration parameters may be performed in an order that, depending on the determinations at each step of the order, obviates the need to gather additional configuration information (e.g., the order provided in FIGS. 3-6). Regardless, the configuration parameters indicate what components are in communication network 122 and how those components are connected in order to determine network topology 132. For example, the configuration parameters may indicate whether gateway(s) 102 are one or more switches and whether those switches are L2 or L3 switches. The configuration parameters further indicate what additional network components are connected to gateway(s) 102 within communication network 122 and the protocols/link configurations between those additional components and gateway(s) 102. The examples below describe how certain configuration parameters indicate various network topology elements for determining network topology 132.

Figure 3:
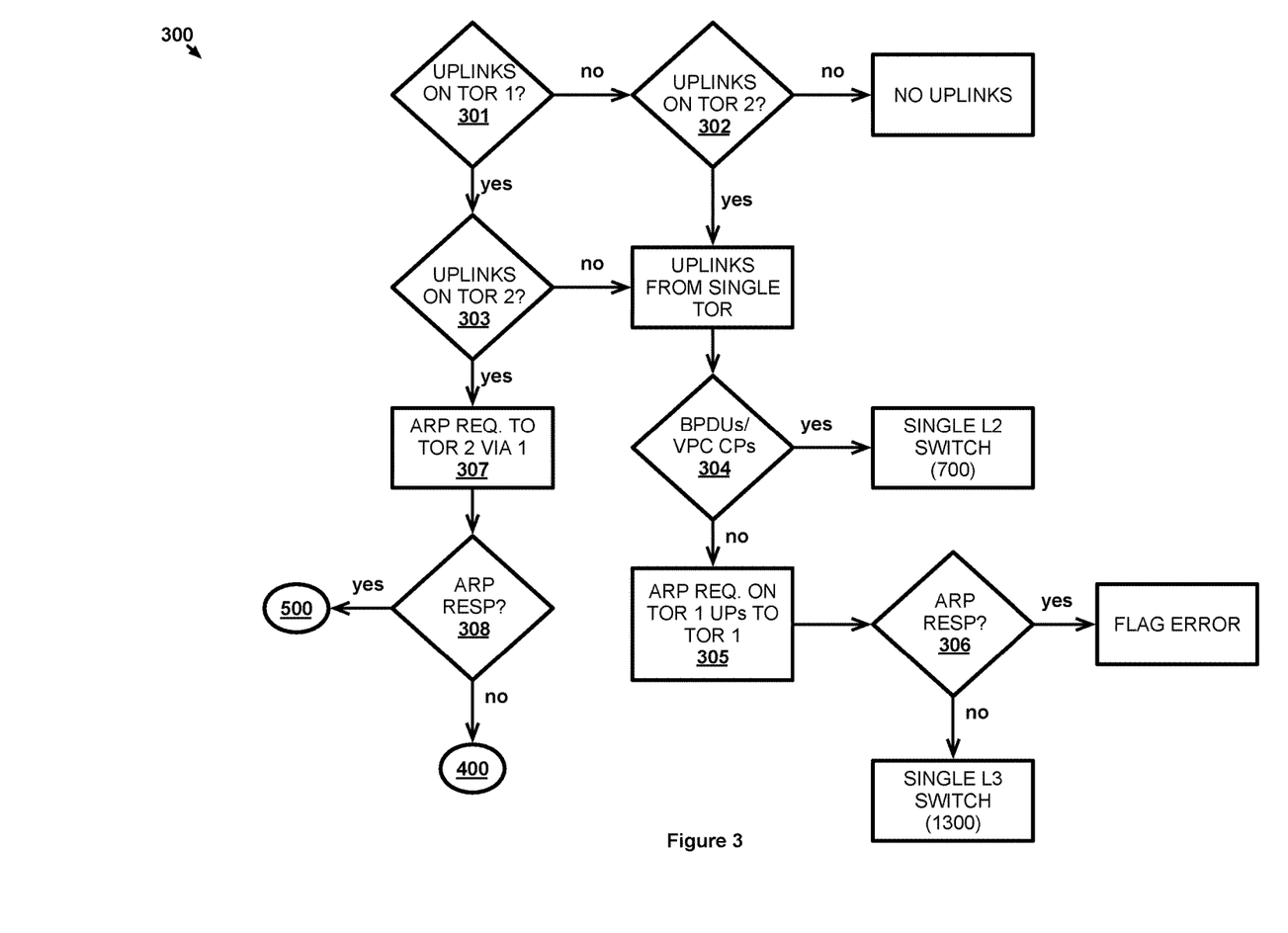
FIG. 3 illustrates another method of operating the network environment to automatically determining network topology.

FIG. 3 illustrates method 300 of operating network environment 100 to automatically determining network topology. In particular, method 300 provides ordered steps that topology determination system 101 uses to determine that network topology 132 comprises one of ten common types of network topologies, which are illustrated in FIGS. 7-16. The topologies illustrated in those figures include upstream switches and Top of Rack (ToR) switches (referred to as ToR 1 and ToR 2), which network servers within their respective computing racks. In some determined topologies, gateway(s) 102 will comprise one or more of the upstream switches while, in other determined topologies, gateway(s) 102 will comprise the ToR switches. At step 301, topology determination system 101 determines whether one or more uplinks exist to ToR 1. Uplink determination is performed by topology determination system 101 checking a hardware status of gateway(s) 102. Topology determination system 101 can therefore similarly determine whether uplinks exist ToR 2 at steps 302 and 303.

Figure 7:
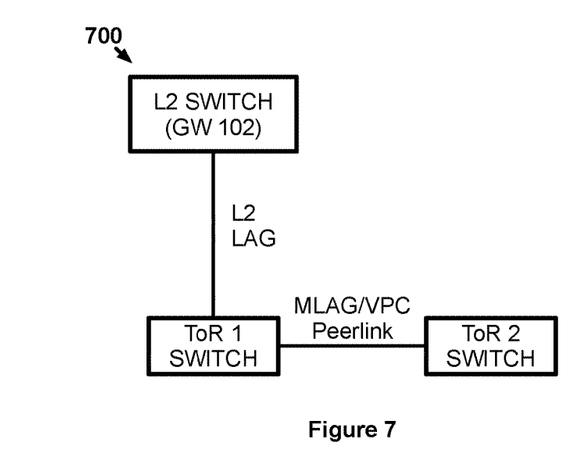
FIG. 7 illustrates a network topology determined by the other method when automatically determining network topology.
Figure 13:
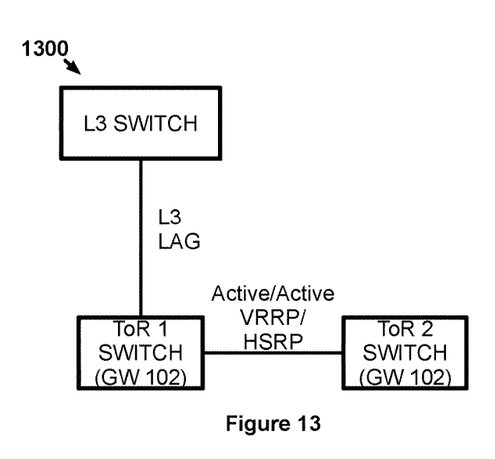
FIG. 13 illustrates a network topology determined by the other method when automatically determining network topology.

If no uplinks are detected after performing steps 301 and 302, then communication network 121 is not connected to communication network 122 and no network topology 132 can be determined. If, however, uplinks are detected to either, but not both, of the ToR switches, then topology determination system 101 determines whether any BPDUs or VPC control packets are present on the uplinks at step 304. Upon detecting BPDUs or VPC control packets at step 304, determines that network topology 132 comprises a single upstream L2 switch acting as gateway 102. FIG. 7 illustrates network topology 700 in an example of network topology 132 wherein gateway 102 is a single L2 switch connected to ToR 1 via a L2 Link Aggregation Group (LAG). ToR 1 is connected to ToR 2 via Multi-Chassis LAG (MLAG)/VPC peerlink when VPC control packets are detected. If no BPDUs or VPC control packets are detected at step 304, topology determination system 101 transfers an ARP request on ToR 1's uplinks to ToR 1 at step 305 (i.e., ToR 1 sends an ARP request to itself). Then, at step 306, topology determination system 101 determines whether a response to the ARP request is received. If a response is received, then topology determination system 101 flags an error because the response indicates an L2 uplink with STP disabled, which can trigger loops in the network. An administrator may be notified in response to the error so that the issue can be addressed. Alternatively, if no response to the ARP request is received, then topology determination system 101 determines network topology 132 comprises a single upstream L3 switch connected to ToR 1 and 2 that comprise gateways 102 via uplinks with ToR 1. FIG. 13 illustrates network topology 1300 in an example of network topology 132 wherein gateways 102 comprise ToR 1 and ToR 2 connected to an upstream L3 switch. ToR 1 and ToR 2 are connected in an active/active arrangement using VRRP or in a failover arrangement using Hot Standby Router Protocol (HSRP). ToR 1 is connected to the single upstream L3 switch is connected using an L3 LAG connection.

Figure 4:
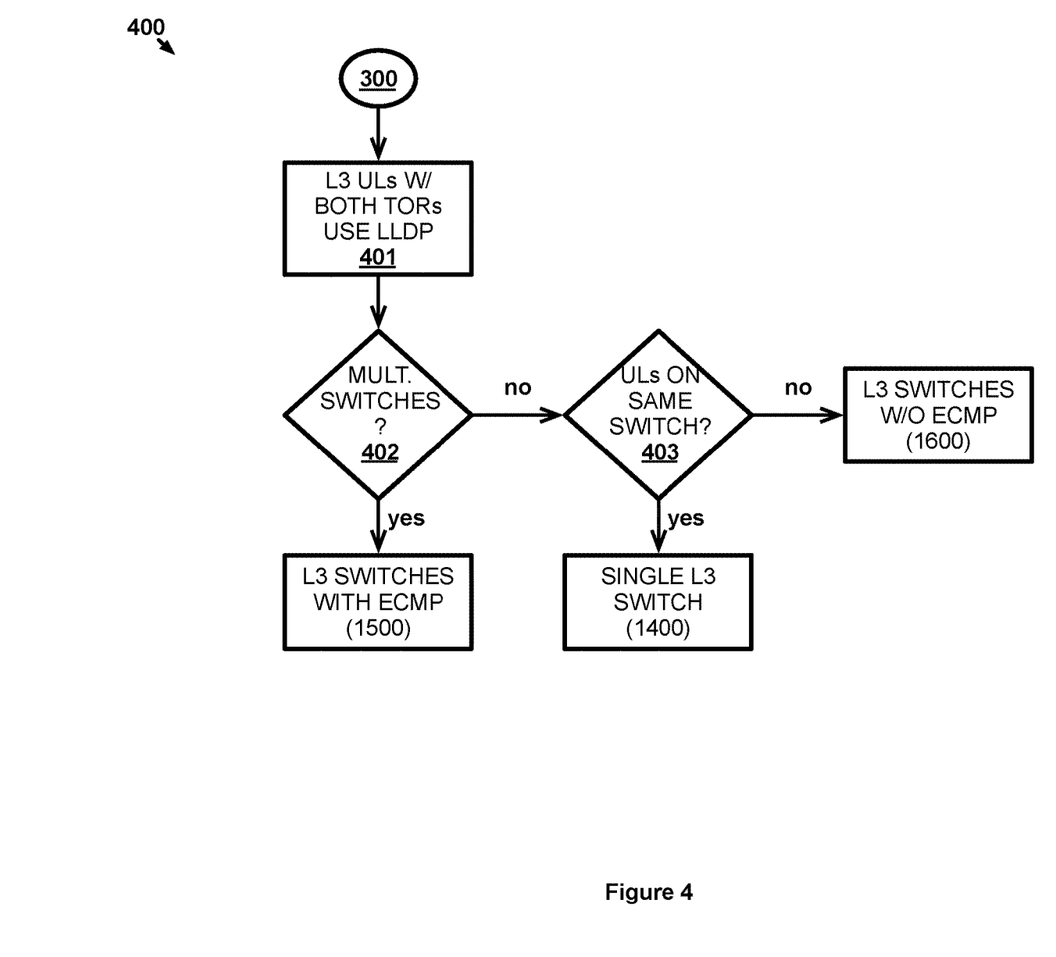
FIG. 4 illustrates a continuation of the other method of operating the network environment to automatically determining network topology.
Figure 5:
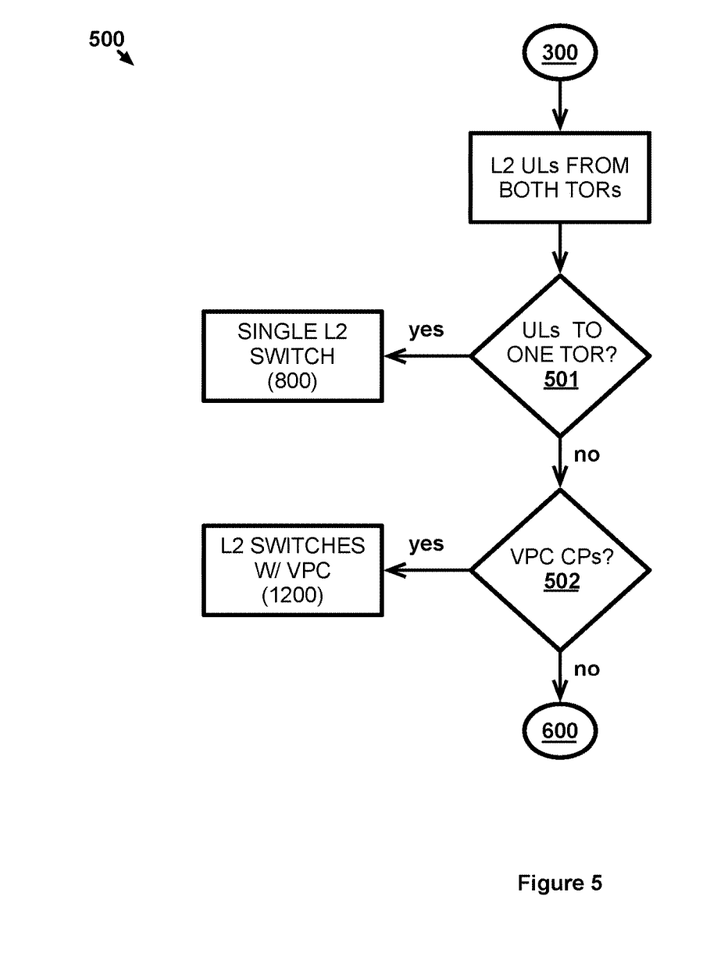
FIG. 5 illustrates another continuation of the other method of operating the network environment to automatically determining network topology.

Referring back to step 303, if topology determination system 101 determines that uplinks exist to both ToR 1 and ToR 2, then topology determination system 101 transfers an ARP request at step 307 to ToR 2 on a ToR 1 uplink. At step 308, topology determination system 101 determines whether a response to that ARP request is received. If a response is received, then method 300 passes to method 500. If a response is not received, then method 300 passes to method 400.

Figure 15:
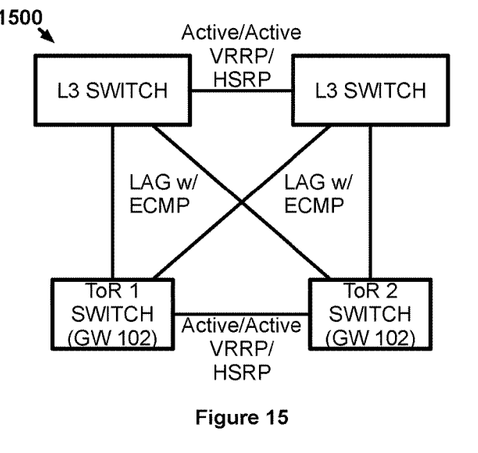
FIG. 15 illustrates a network topology determined by the other method when automatically determining network topology.

FIG. 4 illustrates method 400, which is a continuation of method 300 when a response to the ARP request is not received. Not receiving a response allows topology determination system 101 to conclude that there are L3 uplinks with ToR 1 and ToR 2, and LLDP is then used by topology determination system 101 at step 401 to determine whether those uplinks are connected to multiple upstream switches. At step 402, if topology determination system 101's use of LLDP indicates that the uplinks are connected to multiple upstream L3 switches, then topology determination system 101 determines that network topology 132 comprises ToR 1 and ToR 2, acting as gateways 102, that are connected to those multiple upstream L3 switches using Equal Cost Multipath Routing (ECMP). FIG. 15 illustrates network topology 1500 in an example of network topology 132 wherein gateways 102 comprise ToR 1 and ToR 2 connected to two upstream L3 switches using ECMP. ToR 1 and ToR 2 and the two upstream switches, respectively, are connected in an active/active arrangement using VRRP or in a failover arrangement using HSRP.

Figure 14:
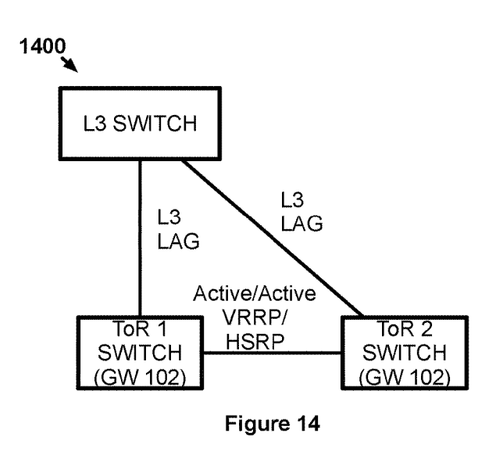
FIG. 14 illustrates a network topology determined by the other method when automatically determining network topology.
Figure 16:
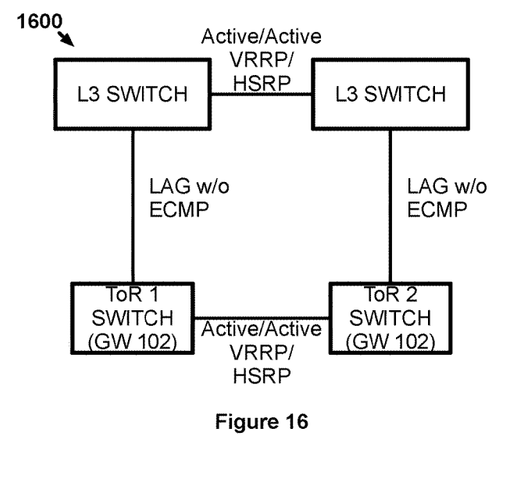
FIG. 16 illustrates a network topology determined by the other method when automatically determining network topology.

If, at step 402, topology determination system 101's use of LLDP indicates that uplinks are not connected to multiple upstream L3 switches, then topology determination system 101 determines whether LLDP indicates that the uplinks from ToR 1 and ToR 2 are connected to multiple upstream switches at step 403. Upon determining that the uplinks are connected to the same upstream switch, topology determination system 101 determines that network topology 132 comprises ToR 1 and ToR 2, acting as gateways 102, that are connected to a single L3 upstream switch. FIG. 14 illustrates network topology 1400 in an example of network topology 132 wherein gateways 102 comprise ToR 1 and ToR 2 connected to a single upstream L3 switch. ToR 1 and ToR 2 are connected in an active/active arrangement using VRRP or in a failover arrangement using HSRP. Alternatively, if topology determination system 101 determines at step 403 that the uplinks are not to the same upstream switch, then topology determination system 101 determines that network topology 132 comprises ToR 1 and ToR 2, acting as gateways 102, that are connected to two upstream L3 switches without ECMP. FIG. 16 illustrates network topology 1600 in an example of network topology 132 wherein gateways 102 comprise ToR 1 and ToR 2 connected to two respective upstream switches without ECMP. ToR 1 and ToR 2 and the two upstream switches, respectively, are connected in an active/active arrangement using VRRP or in a failover arrangement using HSRP.

Figure 8:
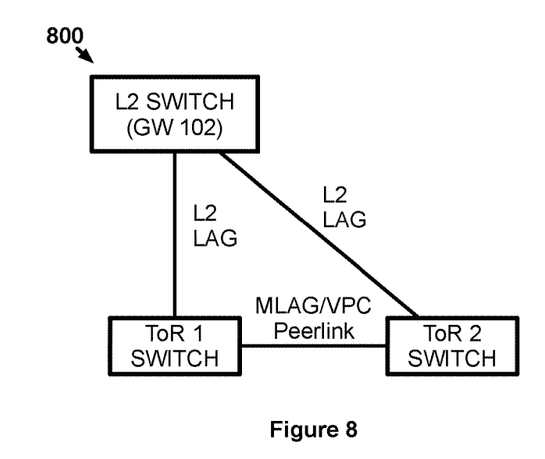
FIG. 8 illustrates a network topology determined by the other method when automatically determining network topology.
Figure 12:
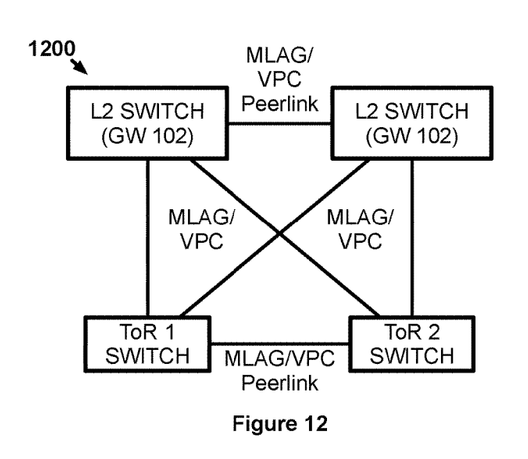
FIG. 12 illustrates a network topology determined by the other method when automatically determining network topology.

FIG. 5 illustrates method 500, which is a continuation of method 300 when a response to the ARP request is received. The ARP response indicates to topology determination system 101 that there are uplinks from ToR 1 and ToR 2. Thus, at step 501, topology determination system 101 determines whether those uplinks are connected to a single switch. If the uplinks are connected to a single upstream switch, then topology determination system 101 determines that gateway 102 comprises a single L2 upstream switch with uplinks ToR 1 and ToR 2. FIG. 8 illustrates network topology 800 in an example of network topology 132 wherein gateway 102 comprises a single L2 upstream switch with uplinks to ToR 1 and ToR 2. ToR 1 and ToR 2 are connected to one another using a MLAG/VPC peerlink. If, however, topology determination system 101 determines that uplinks are not connected to a single upstream switch at step 501, then topology determination system 101 determines whether VPC control packets are detected on the uplinks at step 502. If no VPC control packets are detected, then method 500 passes to method 600. If VPC control packets are detected, then topology determination system 101 determines that network topology 132 comprises two L2 switches, acting as gateways 102, that are connected to ToR 1 and ToR 2 with VPC enabled. FIG. 12 illustrates network topology 1200 in an example of network topology 132 wherein gateways 102 comprise two upstream L2 switches connected to ToR 1 and ToR 2 with MLAG/VPC enabled. ToR 1 and ToR 2 and the two upstream switches, respectively, are connected using a MLAG/VPC peerlink.

Figure 6:
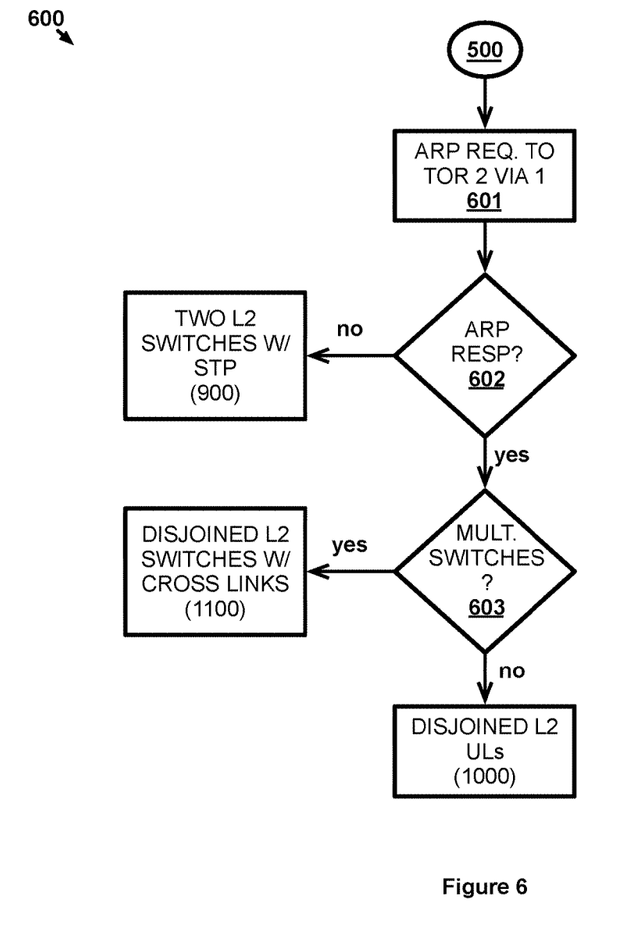
FIG. 6 illustrates yet another continuation of the other method of operating the network environment to automatically determining network topology.
Figure 9:
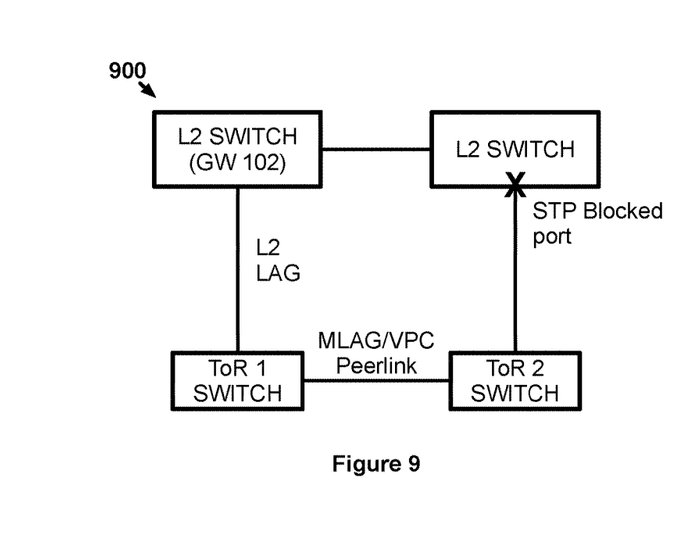
FIG. 9 illustrates a network topology determined by the other method when automatically determining network topology.

FIG. 6 illustrates method 600, which is a continuation of method 500 when no VPC control packets are detected. Topology determination system 101 transfers an ARP request at step 601 to ToR 2 on a ToR 1 uplink. If no response to the ARP request is received, topology determination system 101 determines that network topology 132 comprises two upstream L2 switches with STP and one of those L2 switches comprising gateway 102. FIG. 9 illustrates network topology 900 in an example of network topology 132 with gateway 102 comprising one of two upstream L2 switches with an STP blocked port between the non-gateway 102 switch and ToR 2. ToR 1 and ToR 2 are connected using a MLAG/VPC peerlink.

Figure 10:
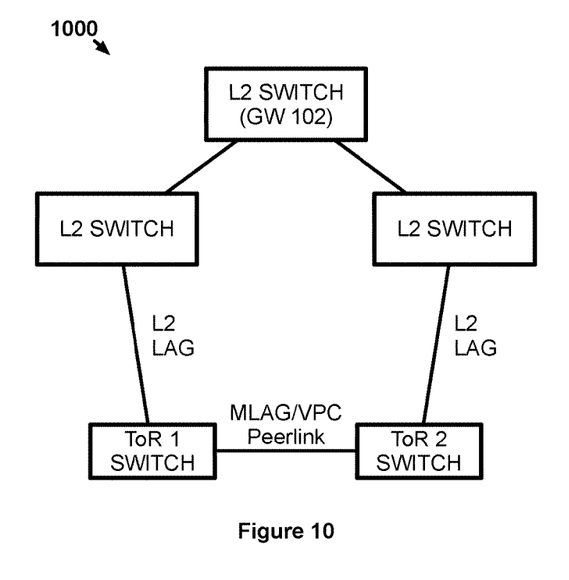
FIG. 10 illustrates a network topology determined by the other method when automatically determining network topology.
Figure 11:
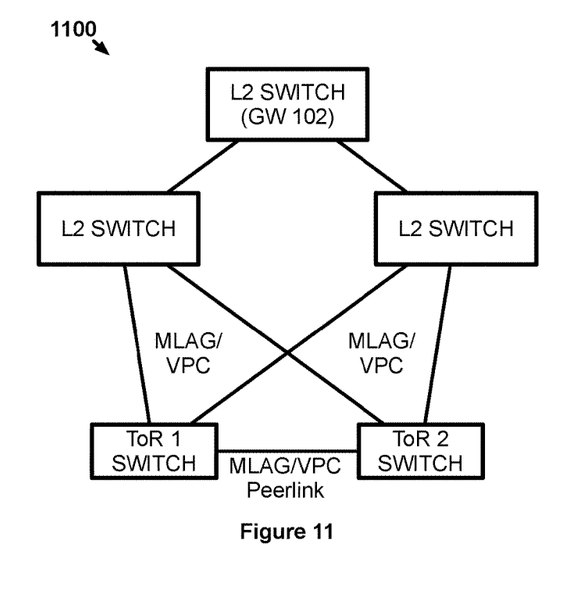
FIG. 11 illustrates a network topology determined by the other method when automatically determining network topology.

If a response to the ARP request is received, topology determination system 101 then determines at step 603 whether the uplinks are connected to multiple switches. If the uplinks are connected to multiple switches, then topology determination system 101 determines that gateway 102 comprises an L2 switch disjoined from other L2 switches with those other two L2 switches connected to ToR 1 and ToR 2 with crosslinks. FIG. 11 illustrates network topology 1100 in an example of network topology 132 with gateway 102 comprising a disjoined L2 switch and ToR 1 and ToR 2 connected with crosslinks using MLAG/VPC. ToR 1 and ToR 2 are connected to each other using a MLAG/VPC peerlink. Alternatively, if the uplinks are not connected to multiple switches, then topology determination system 101 determines that gateway 102 comprises an L2 switch disjoined from other L2 switches with those other two L2 switches connected to ToR 1 and ToR 2 without crosslinks. FIG. 10 illustrates network topology 1000 in an example of network topology 132 with gateway 102 comprising a disjoined L2 switch and ToR 1 and ToR 2 connected to separate upstream switches. ToR 1 and ToR 2 are connected to each other using a MLAG/VPC peerlink.

Advantageously, by following the steps of methods 300-600 above in the order provided, topology determination system 101 is able to determine the network topology 132 of communication network 122 by inferring the topology based on how the protocols detected. Once network topology 132 is determined, topology determination system 101 can configure elements within communication network 121 (e.g., switches, routers, physical/virtual computing systems) to operate in accordance with that topology. The configuration may include configuring subnets, Virtual Local Area Networks (VLANS), Virtual Extensible Local Area Network (VXLAN) tunnels, or other L3 protocols to operate across communication network 121 and communication network 122. Other topology dependent configurations may also be made once topology determination system 101 has determined network topology 132.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. A method of detecting network topology to merge two isolated networks, the method comprising:
   in a first network of the two isolated networks:
     sending probe messages to a second network of the two isolated networks, wherein the probe messages formatted for one or more passive protocols in the second network;
     receiving replies to at least a portion of the probe messages from the second network indicating configuration parameters of the passive protocols;
     receiving neighbor messages from the second network indicating configuration parameters of active protocols in the second network; and
     determining a network topology of the second network using the configuration parameters of the passive protocols and the configuration parameters of the active protocols, wherein determining the network topology includes determining a number of switches in the second network with uplinks to one or more gateways between the first network and the second network by determining a number of uplinks to the second network that are enabled on the one or more gateways.

2. The method of claim 1, further comprising: upon determining that the number of switches is one switch, determining whether Bridge Protocol Data Units (BPDUs) and/or Virtual Port-Channel (VPC) control packets are detected on an uplink from the one switch; upon determining that BPDUs and/or VPC control packets are detected, determining that the network topology comprises a single upstream Level 2 (L2) switch; and upon determining that neither BPDUs nor VPC control packets are detected, using an Address Resolution Protocol (ARP) request to determine that the network topology comprises a single upstream Level 3 (L3) switch.

3. The method of claim 1, further comprising: upon determining that the number of switches is two switches, receiving a response to an Address Resolution Protocol (ARP) request directed to one of the two switches through the other of the two switches, wherein receiving the response indicates that Level 2 (L2) uplinks exist from both of the two switches; if the L2 uplinks are connected to the same switch, determining that the network topology comprises a single L2 upstream switch when the L2 uplinks are connected to the same switch; if the L2 uplinks are not connected to the same switch and Virtual Port-Channel (VPC) control packets are detected on the L2 uplinks, determining that the network topology comprises multiple upstream L2 switches with VPC enabled.

4. The method of claim 3, further comprising:
   if the L2 uplinks are not connected to the same switch and no VPC control packets are detected, transferring a second ARP request directed to the one of the two switches through the other of the two switches;
   if no response to the second ARP request is received, determining that the network topology comprises two upstream L2 switches operating with Spanning Tree Protocol (STP);
   if a response to the second ARP request is received, determining that the network topology comprises multiple disjoined L2 switches with cross links when the L2 uplinks are connected to multiple switches and determining that the network topology comprises multiple disjoined L2 switches without cross links when the L2 uplinks are not connected to multiple switches.

5. The method of claim 1, further comprising: upon determining that the number of switches is two switches, receiving no response to an Address Resolution Protocol (ARP) request directed to one of the two switches through the other of the two switches, wherein receiving no response indicates that Level 3 (L3) uplinks exist from both of the two switches; and using Link Layer Discovery Protocol (LLDP) input to determine whether the L3 uplinks are each connected to multiple switches; if the L3 uplinks are each connected to multiple switches, determining that the network topology comprises two L3 switches with Equal Cost Multipath Routing (ECMP) enabled; and if the L3 uplinks are not each connected to multiple switches: determining that the network topology comprises a single L3 switch when the L3 uplinks are connected to the same switch; and determining that the network topology comprises two L3 switches without ECMP enabled when the L3 uplinks are not connected to the same switch.

6. The method of claim 1, further comprising:
   configuring the first network for communications with the second network based on the network topology.

7. The method of claim 1, wherein the probe messages comprise connection requests to one or more peer nodes in the second network.

8. The method of claim 1, wherein the active protocols include one or more protocols of a protocol set comprising Virtual Router Redundancy Protocol (VRRP), Link Aggregation Control Protocol (LACP), Open Shortest Path First (OSPF), Virtual Port-Channel (VPC), Protocol Independent Multicast (PIM), Link Layer Discovery Protocol (LLDP), Cisco Discovery Protocol (CDP), and Spanning Tree Protocol (STP).

9. The method of claim 1, wherein the passive protocols include one or more protocols of a protocol set comprising Border Gateway Protocol (BGP) and Internet Control Message Protocol (ICMP).

10. A system, in a first network of two isolated networks, for detecting network topology to merge the two isolated networks, the system comprising:
   one or more computer readable storage media;
   a processing system operatively coupled with the one or more computer readable storage media; and
   program instructions stored on the one or more computer readable storage media that, when read and executed by the processing system, direct the processing system to:
      send probe messages to a second network of the two isolated networks, wherein the probe messages formatted for one or more passive protocols in the second network;
      receive replies to at least a portion of the probe messages from the second network indicating configuration parameters of the passive protocols;
      receive neighbor messages from the second network indicating configuration parameters of active protocols in the second network; and
      determine a network topology of the second network using the configuration parameters of the passive protocols and the configuration parameters of the active protocols, wherein to determine the network topology, the program instructions direct the processing system to determine a number of switches in the second network with uplinks to one or more gateways between the first network and the second network by determining a number of uplinks to the second network that are enabled on the one or more gateways.

11. The system of claim 10, wherein the program instructions further direct the processing system to: upon determining that the number of switches is one switch, determine whether Bridge Protocol Data Units (BPDUs) and/or Virtual Port-Channel (VPC) control packets are detected on an uplink from the one switch; upon determining that BPDUs and/or VPC control packets are detected, determine that the network topology comprises a single upstream Level 2 (L2) switch; and upon determining that neither BPDUs nor VPC control packets are detected, use an Address Resolution Protocol (ARP) request to determine that the network topology comprises a single upstream Level 3 (L3) switch.

12. The system of claim 10, wherein the program instructions further direct the processing system to: upon determining that the number of switches is two switches, receive a response to an Address Resolution Protocol (ARP) request directed to one of the two switches through the other of the two switches, wherein receiving the response indicates that Level 2 (L2) uplinks exist from both of the two switches; if the L2 uplinks are connected to the same switch, determine that the network topology comprises a single L2 upstream switch when the L2 uplinks are connected to the same switch; if the L2 uplinks are not connected to the same switch and Virtual Port-Channel (VPC) control packets are detected on the L2 uplinks, determine that the network topology comprises multiple upstream L2 switches with VPC enabled.

13. The system of claim 12, wherein the program instructions further direct the processing system to:
   if the L2 uplinks are not connected to the same switch and no VPC control packets are detected, transfer a second ARP request directed to the one of the two switches through the other of the two switches;
   if no response to the second ARP request is received, determine that the network topology comprises two upstream L2 switches operating with Spanning Tree Protocol (STP);
   if a response to the second ARP request is received, determine that the network topology comprises multiple disjoined L2 switches with cross links when the L2 uplinks are connected to multiple switches and determining that the network topology comprises multiple disjoined L2 switches without cross links when the L2 uplinks are not connected to multiple switches.

14. The system of claim 10, wherein the program instructions further direct the processing system to: upon determining that the number of switches is two switches, receive no response to an Address Resolution Protocol (ARP) request directed to one of the two switches through the other of the two switches, wherein receiving no response indicates that Level 3 (L3) uplinks exist from both of the two switches; and use Link Layer Discovery Protocol (LLDP) input to determine whether the L3 uplinks are each connected to multiple switches; if the L3 uplinks are each connected to multiple switches, determine that the network topology comprises two L3 switches with Equal Cost Multipath Routing (ECMP) enabled; and if the L3 uplinks are not each connected to multiple switches: determine that the network topology comprises a single L3 switch when the L3 uplinks are connected to the same switch; and determine that the network topology comprises two L3 switches without ECMP enabled when the L3 uplinks are not connected to the same switch.

15. The system of claim 10, wherein the program instructions further direct the processing system to:
   configure the first network for communications with the second network based on the network topology.

16. The system of claim 10, wherein the probe messages comprise connection requests to one or more peer nodes in the second network.

17. The system of claim 10, wherein the active protocols include one or more protocols of a protocol set comprising Virtual Router Redundancy Protocol (VRRP), Link Aggregation Control Protocol (LACP), Open Shortest Path First (OSPF), Virtual Port-Channel (VPC), Protocol Independent Multicast (PIM), Link Layer Discovery Protocol (LLDP), Cisco Discovery Protocol (CDP), and Spanning Tree Protocol (STP).

18. The system of claim 10, wherein the passive protocols include one or more protocols of a protocol set comprising Border Gateway Protocol (BGP) and Internet Control Message Protocol (ICMP).

* * * * *